(12) United States Patent
Hanscom (10) Patent No.: US 11,099,557 B2
(45) Date of Patent: Aug. 24, 2021

(54) METHOD OF REMOTELY OBTAINING DRONE FOOTAGE

(71) Applicant: Eric Hanscom, Carlsbad, CA (US)

(72) Inventor: Eric Hanscom, Carlsbad, CA (US)

( * ) Notice: Subject to any disclaimer, the term of this patent is extended or adjusted under 35 U.S.C. 154(b) by 246 days.

(21) Appl. No.: 16/504,297

(22) Filed: Jul. 7, 2019

(65) Prior Publication Data
US 2020/0012275 A1    Jan. 9, 2020

Related U.S. Application Data

(60) Provisional application No. 62/695,086, filed on Jul. 8, 2018.

(51) Int. Cl.
| | | |
|---|---|---|
| *G05D 1/00* | (2006.01) | |
| *G06Q 10/02* | (2012.01) | |
| *B64C 39/02* | (2006.01) | |
| *G06Q 30/06* | (2012.01) | |

(52) U.S. Cl.
CPC ......... *G05D 1/0038* (2013.01); *B64C 39/024* (2013.01); *G05D 1/0033* (2013.01); *G05D 1/0044* (2013.01); *G06Q 10/02* (2013.01); *B64C 2201/127* (2013.01); *B64C 2201/146* (2013.01); *G05D 1/005* (2013.01); *G06Q 30/0645* (2013.01)

(58) Field of Classification Search
CPC .. G05D 1/0038; G05D 1/0033; G05D 1/0044; G05D 1/005; B64C 39/024; B64C 2201/127; B64C 2201/146; G06Q 10/02; G06Q 30/0645

See application file for complete search history.

(56) References Cited

U.S. PATENT DOCUMENTS

| | | | | |
|---|---|---|---|---|
| 7,123,166 B1* | 10/2006 | Haynes | ..................... | G08G 1/14 |
| | | | | 340/932.2 |
| 2017/0231213 A1* | 8/2017 | Gordon | ................ | G05D 1/0094 |
| | | | | 43/132.1 |
| 2019/0002127 A1* | 1/2019 | Straus | ..................... | B64F 1/007 |
| 2019/0034868 A1* | 1/2019 | Konanur | ............... | B64C 39/024 |

FOREIGN PATENT DOCUMENTS

| | | | | |
|---|---|---|---|---|
| CN | 108876514 A | * | 11/2018 | |
| WO | WO-2018066744 A1 | * | 4/2018 | ............. B64D 47/08 |
| WO | WO-2019125357 A1 | * | 6/2019 | ............. B64F 1/005 |

* cited by examiner

*Primary Examiner* — Hunter B Lonsberry
*Assistant Examiner* — Jay Khandpur
(74) *Attorney, Agent, or Firm* — Eric Hanscom (57) ABSTRACT

This invention is directed toward a method by which a user desiring drone footage from a location can hire a drone owner near that location to set up the drone for remote control flight at the location. The user and owner can agree to a set of parameters prior to the flight which determine the environmental conditions under which the flight can take place, the duration of the flight, any safety protocols the parties agree to, etc. One the parameters are met, the drone owner takes the drone to the location, the user remotely connects to the drone and flies the drone subject to the parameters, then downloads the footage taken by the drone during the flight.

20 Claims, 7 Drawing Sheets

and …

METHOD OF REMOTELY OBTAINING DRONE FOOTAGE

CROSS REFERENCE TO RELATED APPLICATIONS

This application claims priority to U.S. Provisional No. 62/695,086, filed Jul. 8, 2018, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of remote control of drones and drone flying and photography/videography in general, and more specifically, a method by which a user (one who desires to obtain drone footage from a location the user does not wish to travel to) can contract with a drone owner in that location or nearby for the user to remotely control the owner's drone and take the desired footage.

Over the past five years, drones have gone from being an expensive toy for (mainly) rich (mainly) men, to an ever-growing part of everyday life. One of the most popular uses of drones is to take photographs and videos from the drone. As the technology progresses, a new profession—drone photographer/videographer—has emerged. For the average drone photographers/videographers, once the initial excitement over being able to "fly the camera" is over, they begin looking for new locations to add to their portfolios. While there are a large number of marvelous places to fly a drone and take pictures and videos, it costs money to get there!

For example, the inventor of this invention likes to fly his drone in Iceland. Traveling from his home in Carlsbad, Calif., he drives to Los Angeles International Airport ($50 of gas), parks for a week in one of the local parking garages ($100), flies to Iceland ($800 or more), rents a car ($300), and pays the extremely high Icelandic prices for hotels ($150/night), food ($50/day if you eat on a budget) and gas ($12/gallon at the cheaper gas stations). So, after having spent several thousand dollars and a week of his time, he will hopefully return from Iceland with several hundred nice drone photos and around 45 minutes of unedited drone video. However, Iceland is famous for wind and rain, two environmental factors that can turn a day of drone flying into a day waiting in the rental car for both the rain and wind to go away to the point where he can fly his drone. So, there have been trips where the inventor has returned from such a trip with under 100 photographs and around 15 minutes of very shaky video footage taken in very windy conditions. Now, when you take into consideration that flying drones is a hobby for the inventor, and that every day he spends flying drones in Iceland (or sitting in his car waiting for the wind and rain to subside), he is foregoing his considerably better paying day job of being a patent attorney, it becomes apparent that the current method of obtaining drone photographs and videos—namely, traveling to the desired location with a drone and taking the pictures by physically being there—is not very efficient. Fun yes, but not very efficient.

Thus, there exists a real economic opportunity for a less expensive and less time-consuming means by which dronists (those who fly drones) can obtain drone photographs and videos that they have personally taken.

The current invention solves this problem with a method by which drone owners ("drone owners") near desired droning locations can set up their drones near a desired location and let another droninst ("drone operators") actually control the drone flight and take the pictures/video through the cloud. Since the dronists taking the pictures and videos are the "artist", they own the images, and the rental/set up fee the drone owner charges will be significantly less that the cost of drone operator traveling to that location, and without the time commitment.

The drone operator could set the time for the drone flight either by picking a day and time, or through environmental factors previously agreed upon with the drone owner. For example, an operator could schedule a flight as follows:

1. Take off location is Reykjanes Peninsula, approximately 20' north of the large dodo bird statue.
2. Acceptable environmental conditions will be sunny (minimum 10% cloud cover), between 8 AM and 10 AM in the morning so the sunlight will be from the back, with winds at or less than 5 mpg.
3. Drone is Phantom 4 or Mavic 2.
4. Time in air shall be minimum of 2 fully charged batteries, with an expected flight time of 40 minutes. Depending on the quality of the footage, I may hire you for an additional two batteries.
5. Operation. Drone owner will hook me into the drone via the (fill in the blank) _______ program. I will control the drone manually. Drone owner will have emergency takeover capacity if there is an environmental problem or a problem with the drone software/control.

An alternate means of control would be for the operator to pre-plan a flight path through one of the available flight planners and send it to the owner, who would download the program into the drone and then launch the drone at the desired time or upon reaching the mutually-agreed upon environmental conditions.

In addition to providing drone photographers and videographers with remote access to drones in shooting locations they do not have to physically visit, this invention has other uses. For example, people may wish to take "drone vacations" in which they remotely pilot a drone in a location they would like to vicariously visit. Another use would be for security purposes, where law enforcement or a security monitoring company could ask a third party to set up a drone for a specific flight to determine what is going on at a specific location.

REFERENCE NUMBERS USED

1. User
2. Owner of the drone
3. Drone
4. User's Controller
5. User's computer
6. User's monitor
7. Control signal
8. Scenic location
9. Owner's controller
10. Drone footage
11. Drone battery
12. Downloading of footage
13. Drone carrying case

OBJECTS OF THE INVENTION

It is therefore an object of the present invention to provide a method by which a user in location A, who wants drone footage from scenic location B, can hire a drone owner in or near scenic location B, control that drone through remote control software, then take and download drone photographs and video during the flight in location B.

Another aspect of the invention allows for the owner of the drone to change batteries and perform other physical tasks that are normally performed by the drone operator under the current state-of-the-art drone flight technology.

It is a further aspect of the invention that the user and the drone owner can negotiate a "rental contract" for the use of the drone by the user, specifying a number of contractual components such as make and model of the drone, location to be flown, time of flight and/or number of batteries to be used during the flight, a window of time during the day during which the flight may take place, and the necessary environment conditions such as wind velocity, cloud cover, precipitation, presence (or lack) of endangered species and humans, and other environmental conditions that may affect the flight.

Another aspect of the invention allows the user to download drone footage directly from the drone.

While a preferred embodiment of this invention is for use by a drone photographer wanting to acquire additional drone footage without having to absorb the losses of time and expense in getting to a remote location, other aspects of the invention include allowing users to fly a drone for a "drone vacation", and for people interested in security to remotely hire drones to perform security assessments.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Figure 1:
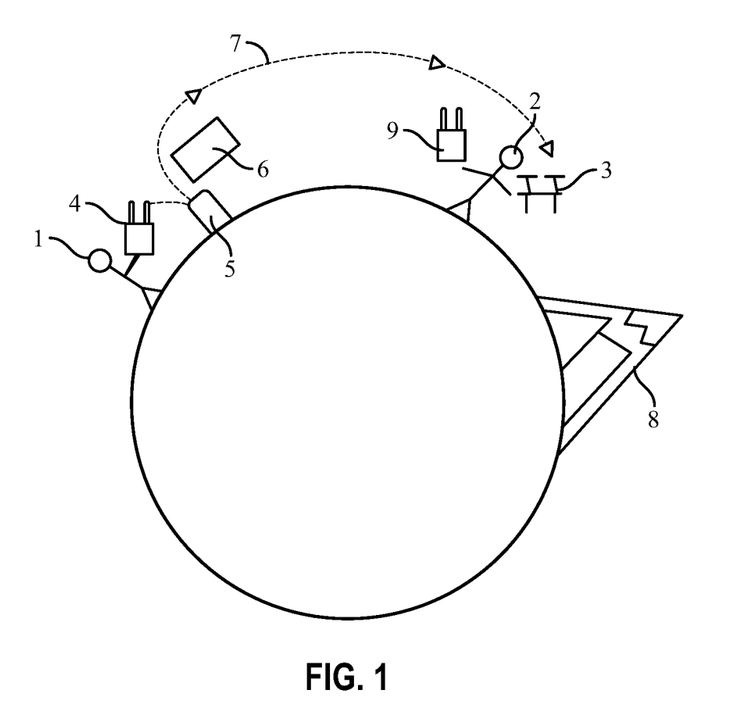
FIG. 1 is a perspective view of the user connecting to the drone held by the owner.

FIG. 1 is a perspective view of the user connecting to the drone held by the owner. The user 1 is a person who desires to obtain drone footage from a location that is far enough away from the user's home that the user would rather "rent" a drone in that particular location rather than travel there. The user 1 has already agreed on a set of parameters with an owner 2 of the drone 3. These parameters basically define a contract between the user and the owner which defines not only the cost, but also the conditions under which the flight will occur. One such parameter is the start time. Because drone operators generally prefer to be backlit during their photographic flights, they may prefer a morning flight (if shooting west) or an afternoon flight (if shooting east). The opposite, however, may also be true if the dronist wants to silhouette the object against either a rising or setting sun. Another parameter is the length of the flight, and how many batteries, of what quality, will be used.

The user and owner will also want to put in writing the environmental conditions under which the flight may take place, and how the owner will be compensated (or not) should environmental conditions halt a flight partially completed, or cause the owner to call off the entire flight once he/she reaches the desired location. The environmental conditions can be the likelihood (or presence of) rain and/or high winds, both of which will normally keep drones safely in the back of the owner's car. Other environmental considerations may be the presence of humans and/or easily flushed animals. In some countries it is illegal to fly drones over people and to use drones in a manner that disturbs wildlife. The agreement should also state which party is responsible for paying any insurance on the drone while it is flying (after all, the safety of the drone is a combination of the owner's maintenance and the user's piloting skills). Finally, the parties should agree on who is responsible for making sure that the proposed flight is a legal one, and if ATC (Air Traffic Control) needs to be notified, the agreement should state which party much do the proper notifications.

Once the contract has been signed and the environmental parameters have been met, the owner takes the drone 3 to the desired location 8. The user has a user's controller 4 which is connected to the drone 3 through the user's computer 5.

The view from the camera of the drone 3 is shown in the user's monitor 6 so that the user can see exactly what stills or video the drone is recording during the flight or flights. The user's computer 5 sends a remote control signal 7 to the drone which allows the user 1 to control the drone 3, even though the drone can be located across the globe. The owner 2 has an owner's controller 9 which serves as an emergency backup if the signal 7 from the user's computer 5 is interrupted; this allows the owner 2 to take over control of the drone 3 as required.

Figure 2:
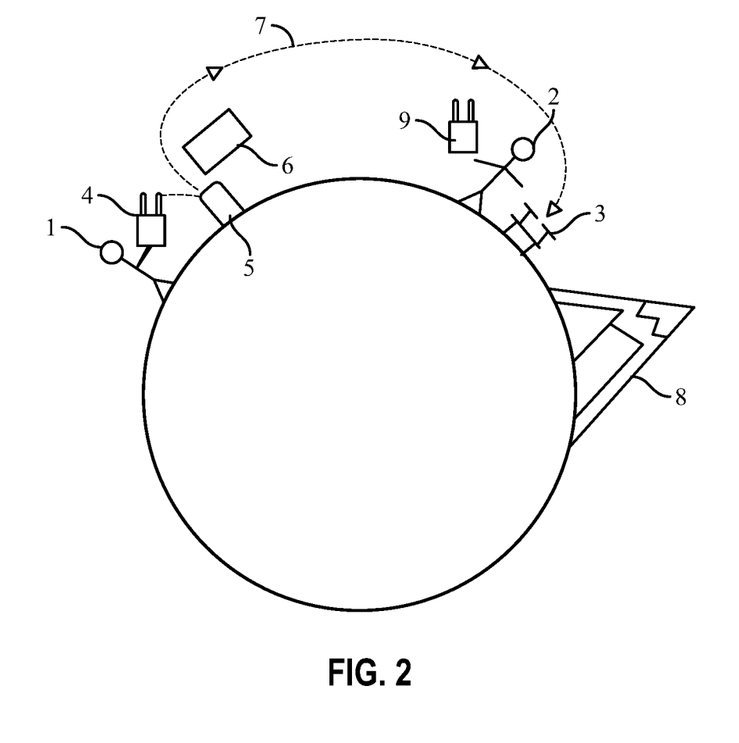
FIG. 2 is a perspective view of the drone being remotely controlled by the user, which the owner watches, with a owner's controller as a backup in case the connection between the user's controller and the drone is interrupted.

FIG. 2 is a perspective view of the drone 3 being remotely controlled by the user 1, which the owner 2 watches, with a owner's controller 9 as a backup in case the connection between the user's controller and the drone is interrupted. The owner 2 has removed physical control over the drone 3, and the user 1 is controlling the drone through signal 7. As the drone 3 flies, that part of the location that the drone is photographing or recording as video can be seen on the user's monitor 6.

Figure 3:
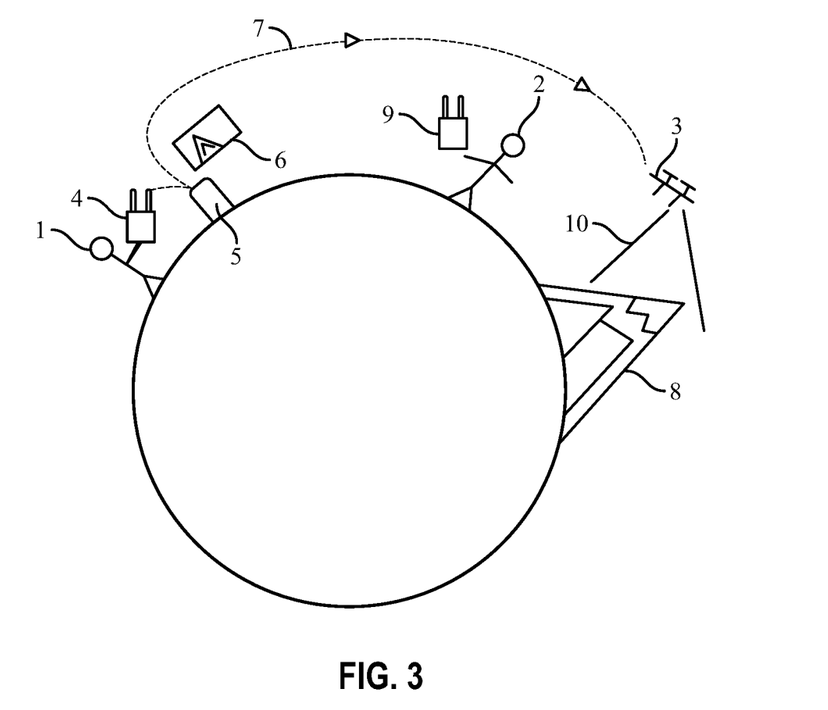
FIG. 3 is a perspective view of the user flying the drone and taking footage of the location.

FIG. 3 is a perspective view of the user 1 flying the drone 3 and taking footage 10 of the location. In this figure, the user 1 is in complete control of the drone 3 through signal 7. The user 1 controls the height, direction, camera angle, and whether the drone is shooting stills or video through user's controller 4. The user can see exactly what footage is being obtained through the display on the user's monitor 6

Figure 4:
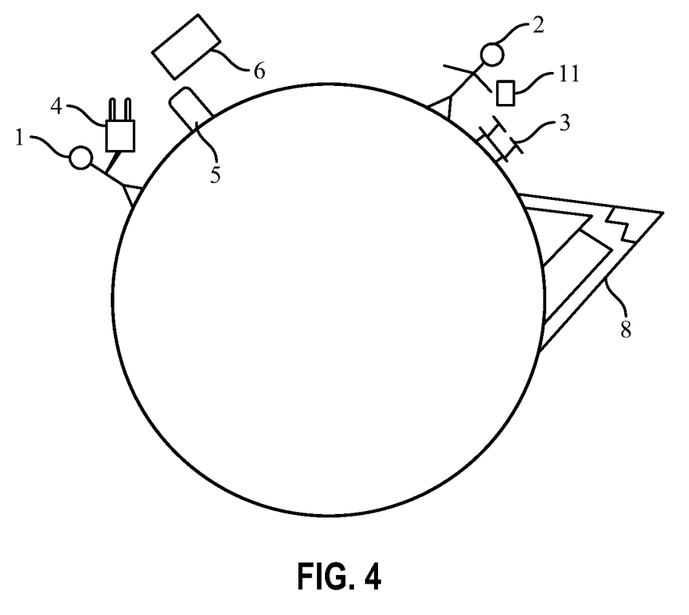
FIG. 4 is a perspective view of the owner exchanging batteries to give the user additional flying time.

FIG. 4 is a perspective view of the owner 3 exchanging batteries 11 to give the user additional flying time. Per the parameters the user and owner have agreed to previously, many users will want to fly the drone for several battery's worth of flights, so after the first battery has run down, and user (or owner) will land the drone and the user will replace the spent battery with a fresh one.

Figure 5:
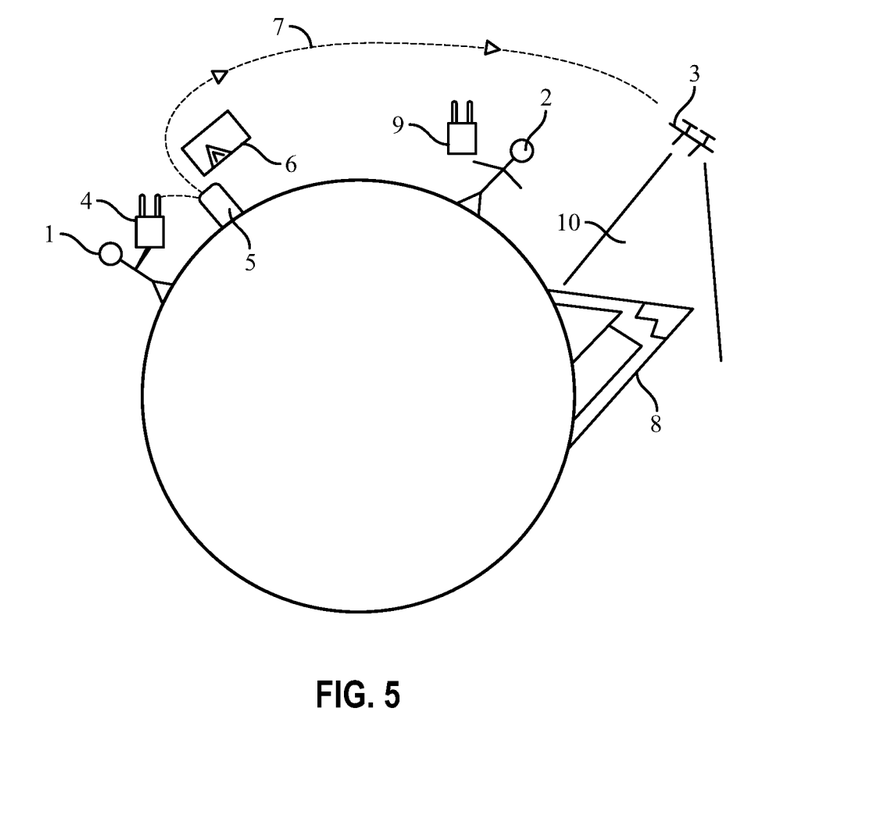
FIG. 5 is a perspective view of the user taking a second flight and taking footage of a different part of the location.

FIG. 5 is a perspective view of the user taking a second flight and taking footage 10 of a different part of the location 8. The new footage 10 is a direct result of the user 1 flying the drone to a different part of the location and/or directing the camera in a new direction.

Figure 6:
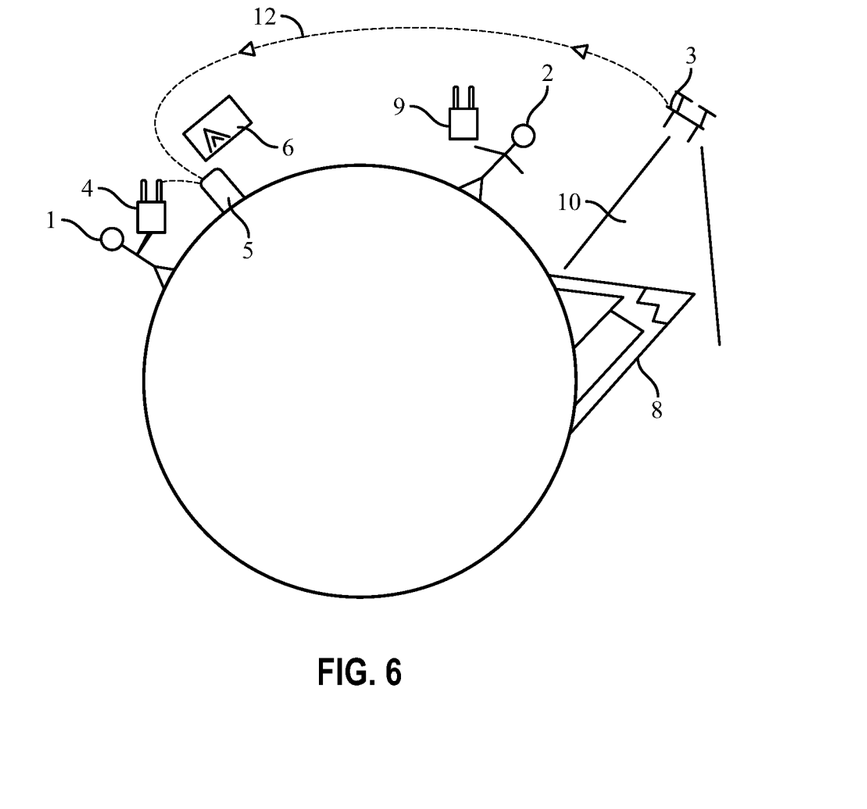
FIG. 6 is a perspective view of the user downloading the footage after the flying of the drone is completed for this project.

FIG. 6 is a perspective view of the user 1 downloading the footage 12 after the flying of the drone is completed for this project. The footage is downloaded directly onto the user's computer, so there are no questions of ownership/copyright of the footage. The owner waits until the downloading is finished.

Figure 7:
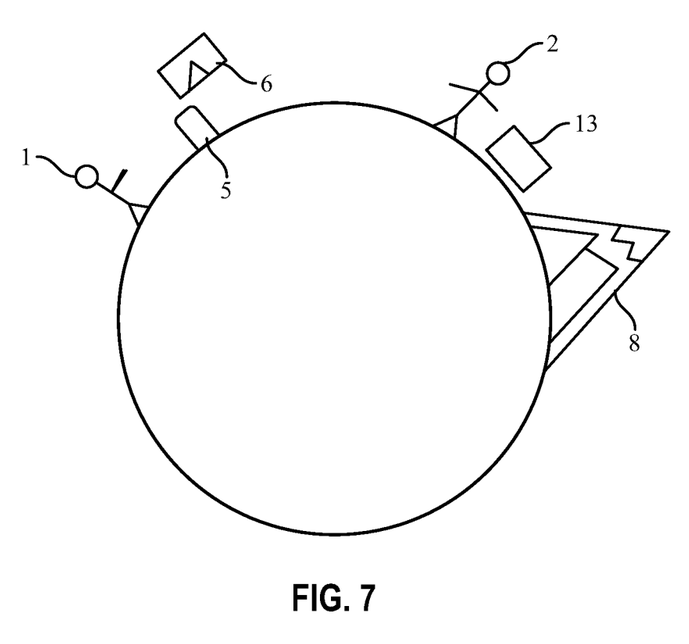
FIG. 7 is a perspective view of the user beginning to edit the drone footage while the owner of the drone puts the drone away.

FIG. 7 is a perspective view of the user 1 beginning to edit the drone footage while the owner 2 of the drone puts the drone away in a drone carrying case 13. The project is over and the user begins to edit the footage on computer 5 and monitor 6 while the owner 2 puts the drone away.

There are a number of variations on this same general theme. A drone owner can have an entire fleet of drones. For example, the drone owner could have both fixed wing (Parrot Disco, for example) and quadcopters (Bebop, Phantom, etc.) with different rental prices for drone of different quality and purchase price. The drone could try to coordinate a trip to a particular location to serve multiple users. Bring a remote battery charger would allow the drone owner to keep drones up in the air throughout the day, thereby maximizing the profit as the amount of "paid flying time" would be much great per mile driven to the location and time spent driving.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A method of remotely obtaining drone footage, comprising the steps of, first, hiring an owner in a predetermined location, where the owner is a drone owner and scheduling a drone flight, second, having the drone owner place a drone at the predetermined location at a predetermined time on a predetermined day, third, having a user who is at a location away from the predetermined location of the owner and who signs a contract with the owner to remotely accesses the drone, fourth, the user performing a drone flight where the user controls the drone with a user's controller connected to a user's computer located at the location of the user, where the user's computer sends a remote control signal to the drone which allows the user to control the drone, and where the user's controller is different from the owner's controller of the drone in the predetermined location, fifth, downloading drone video and drone photographs from the drone flight, sixth, landing the drone.

2. The method of claim 1, where the contract is negotiated between and agreed upon by the owner and the user.

3. The method of claim 2, where the contract includes a date and a time for the drone flight.

4. The method of claim 3, where the contract includes at least one environmental condition.

5. The method of claim 2, where the at least one environmental condition includes precipitation at the time of the flight.

6. The method of claim 2, where the at least one environmental condition includes wind velocity at the time of the flight.

7. The method of claim 2, where the at least one environmental condition includes the presence of humans a set distance from the predetermined location.

8. The method of claim 2, where the at least one environmental condition includes the presence of at least one species of animal a set distance from the predetermined location.

9. The method of claim 8, where the at least one species of animal includes an endangered species of animal.

10. The method of claim 8, where the at least one species of animal includes a species of animal that is easily flushed by drones.

11. The method of claim 8, where the at least one species of animal includes a species of animal that is nesting at the predetermined time.

12. The method of claim 1, additionally comprising a software element, where the software element resides on the user's controller and the drone, and where the user can control the drone through the software element.

13. The method of claim 12, where the software element additionally allows the user to download the drone video and the drone photographs directly from the drone.

14. A method of remotely obtaining drone footage, comprising the steps of, first, hiring an owner in a predetermined location, where the owner is a drone owner and scheduling a drone flight, second, having the drone owner place a drone at the predetermined location at a predetermined time on a predetermined day, third, having a user who is at a location away from the predetermined location of the owner and who signs a contract with the owner to remotely accesses the drone, fourth, the user performing a drone flight where the user controls the drone with a user's controller connected to a user's computer located at the location of the user, where the user's computer sends a remote control signal to the drone which allows the user to control the drone, and where the user's controller is different from the owner's controller of the drone in the predetermined location, fifth, downloading drone video and drone photographs from the drone flight, sixth, landing the drone, where the contract is negotiated between and agreed upon by the owner and the user, where the contract includes a date and a time for the drone flight, where a software element resides on the user's controller and the drone, and where the user can control the drone through the software element, where the software element additionally allows the user to download the drone video and the drone photographs directly from the drone, and where the contract includes at least one environmental condition.

15. The method of claim 14, where the at least one environmental condition is selected from the group consisting of: precipitation at the time of the flight, and, wind velocity at the time of the flight.

16. A method of remotely obtaining drone footage, consisting of the steps of, first, hiring an owner in a predetermined location, where the owner is a drone owner and scheduling a drone flight, second, having the drone owner place a drone at the predetermined location at a predetermined time on a predetermined day, third, having a user who is at a location away from the predetermined location of the owner and who signs a contract with the owner to remotely accesses the drone, fourth, the user performing a drone flight where the user controls the drone with a user's controller connected to a user's computer located at the location of the user, where the user's computer sends a remote control signal to the drone which allows the user to control the drone, and where the user's controller is different from the owner's controller of the drone in the predetermined location a drone signal, fifth, downloading drone video and drone photographs from the drone flight, sixth, landing the drone.

17. The method of claim 16, where the contract is negotiated between and agreed upon by the owner and the user.

18. The method of claim 17, where the contract includes a date and a time for the drone flight.

19. The method of claim 16, additionally comprising a software element, where the software element resides on the user's controller and the drone, and where the user can control the drone through the software element, where the software element additionally allows the user to download the drone video and the drone photographs directly from the drone, where the contract includes at least one environmental condition.

20. The method of claim 19, where the at least one environmental condition is selected from the group consisting of: precipitation at the time of the flight, and, wind velocity at the time of the flight.

* * * * *